May 12, 1970 LA VERGNE H. WILLIAMS 3,512,175
ELAPSED TIME RECORDER
Filed Aug. 8, 1968 5 Sheets-Sheet 1
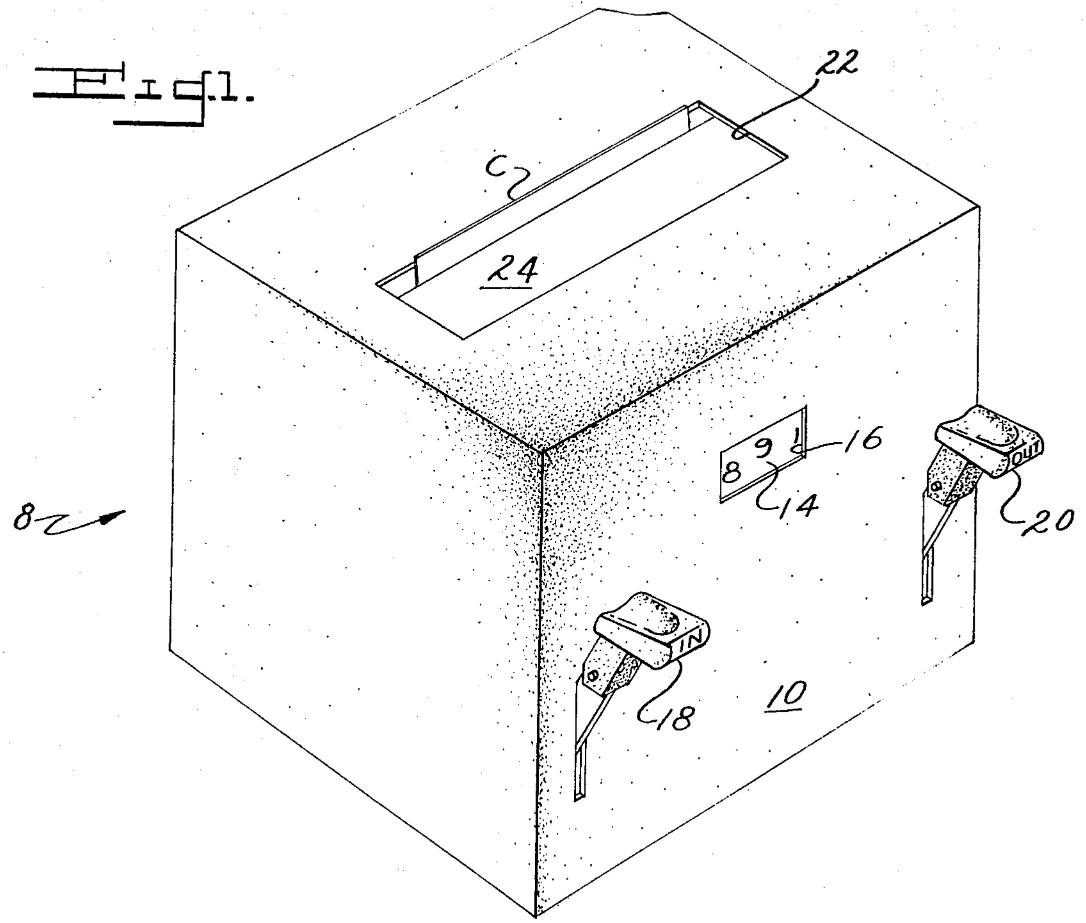
FIG. 2.
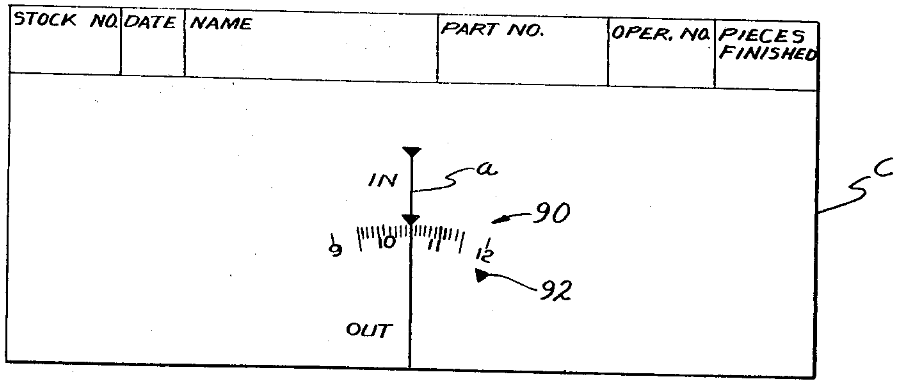
INVENTOR.
LA VERGNE H. WILLIAMS
BY Chapin, Neal & Dempsey
Attorneys May 12, 1970 LA VERGNE H. WILLIAMS 3,512,175

ELAPSED TIME RECORDER

Filed Aug. 8, 1968 5 Sheets-Sheet 2

INVENTOR.
LaVERGNE H. WILLIAMS
BY Chapin, Neal & Dempsey
Attorneys

May 12, 1970 LA VERGNE H. WILLIAMS 3,512,175

ELAPSED TIME RECORDER

Filed Aug. 8, 1968 5 Sheets-Sheet 3

May 12, 1970 LA VERGNE H. WILLIAMS 3,512,175

ELAPSED TIME RECORDER

Filed Aug. 8, 1968 5 Sheets-Sheet 4

INVENTOR.
LA VERGNE H. WILLIAMS
BY Chapin, Neal & Dempsey
Attorneys

ELAPSED TIME RECORDER

Filed Aug. 8, 1968 5 Sheets-Sheet 5

INVENTOR.
LA VERGNE H. WILLIAMS
BY Chapin, Neal & Dempsey
attorneys

United States Patent Office 3,512,175

Patented May 12, 1970

3,512,175

ELAPSED TIME RECORDER

La Vergne H. Williams, Columbia, Conn., assignor to The Gunver Manufacturing Company, Manchester, Conn., a corporation of Connecticut Filed Aug. 8, 1968, Ser. No. 751,317
Int. Cl. G07c *1/06*
U.S. Cl. 346—82 4 Claims

ABSTRACT OF THE DISCLOSURE

An elapsed time mechanism having a clock mechanism rotating a printing disc with two concentric bands of time-related indicia, a unitary printing striker pivotably disposed and having a surface of sufficient radial extent to engage simultaneously both said concentric bands of indicia. A card carrier carried on said striker on the side toward the printing disc. Separate printing levers for bringing a card disposed in said carrier into printing contact with the printing disc and a shield movable radially of said printing disc and disposed between the disc and the card carrier, said shield being movable in response to operation of one of the printing levers.

BACKGROUND

The elapsed time mechanism of this invention is an improvement over the elapsed time recorder with the printing disc and concentrically mounted strikers disclosed in copending application Ser. No. 619,345, filed Feb. 28, 1967, now Pat. No. 3,409,903, assigned to the same assignee as this application.

The principal object of this invention is to provide an elapsed time mechanism which is accurate and reliable while being relatively inexpensive, easy to manufacture and with relatively few moving parts.

Another object of this invention is to provide an elapsed time clock having a single printing disc and striker mechanism.

The above and other objects and advantages of this invention will be more readily apparent from the following description with reference to the accompanying drawings:

FIG. 1 is a perspective view showing a time clock embodying the present invention;

FIG. 2 is a view showing a time card used with the present invention of "In" time indicia printed thereon;

Figure 3:
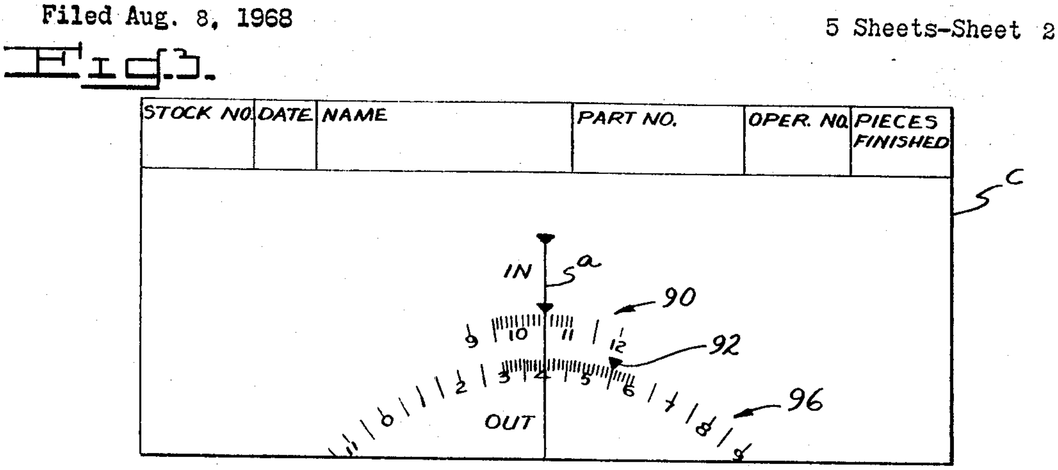
FIG. 3 is a view of a time card showing "In" and "Out" time indicia printed thereon, as well as elapsed time.

Referring to FIG. 1 for an overall description of the present invention it will be seen that a time clock 8 comprises outer casing or housing 10. The front wall of the housing 10 is provided with an opening 16 through which a time indicating dial may be viewed. A lever 18, which as shown, may be marked "In" and another lever 20 designated "Out" are disposed on opposite sides of an indicating dial 14. The top wall of the housing is slotted at 22 to provide access to a card receiver or carrier 24, opening upwardly to receive time cards *c*, also shown in FIG. 2. The slot 22 is of sufficient size to accommodate movement of the carrier as will hereinafter be described.

Figure 4:
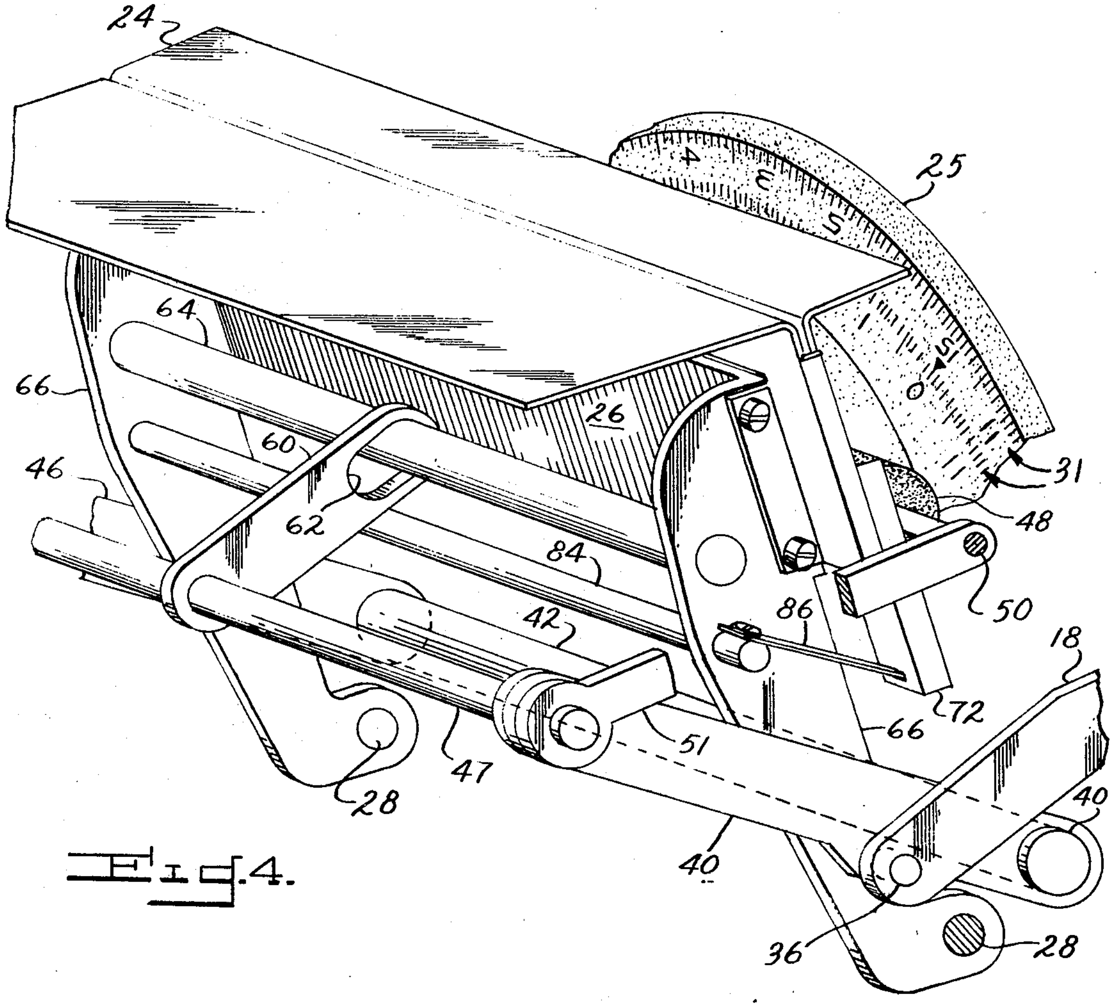
FIG. 4 is a partial perspective view showing the card carrier and striker mechanism of the time clock.
Figure 5:
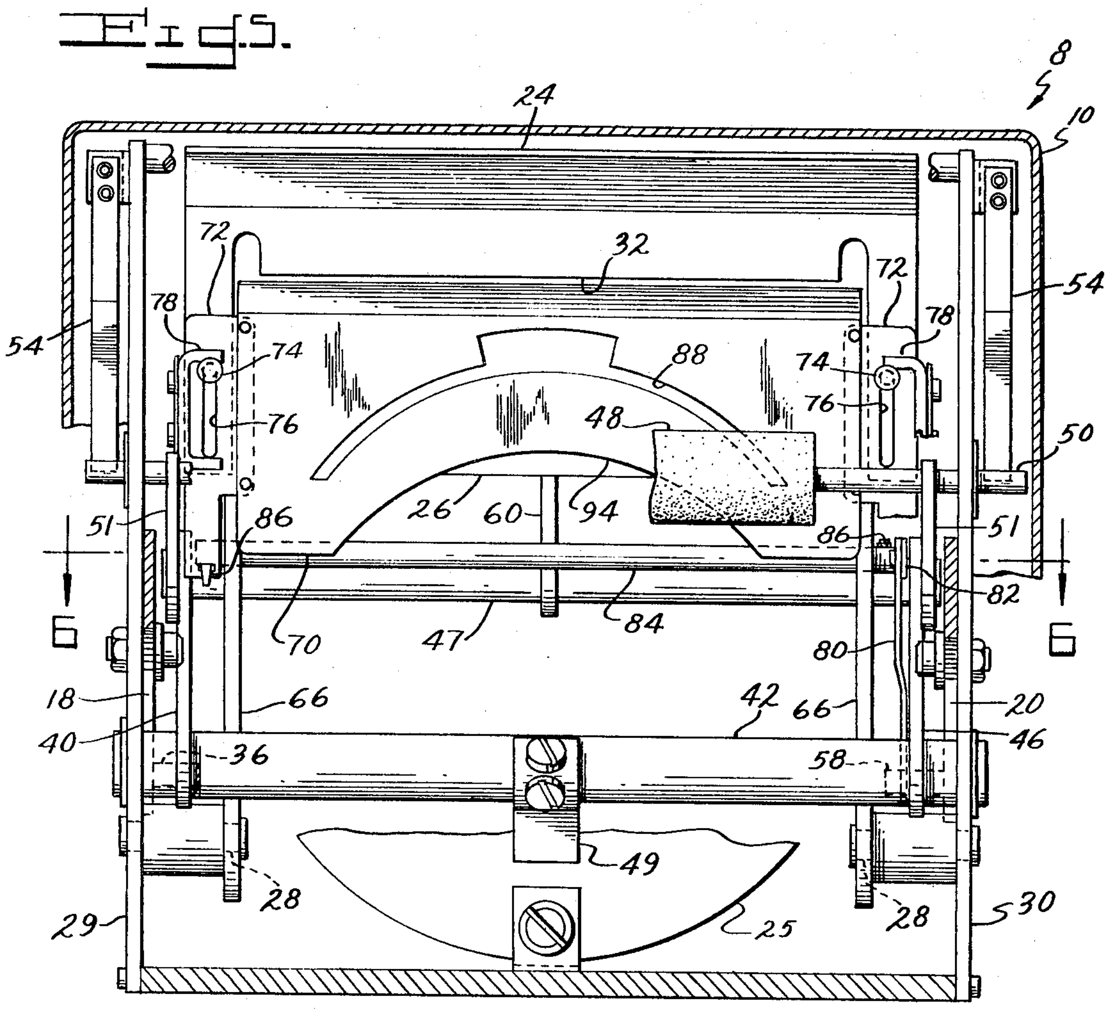
FIG. 5 is a front elevational view of the time clock.
Figure 6:
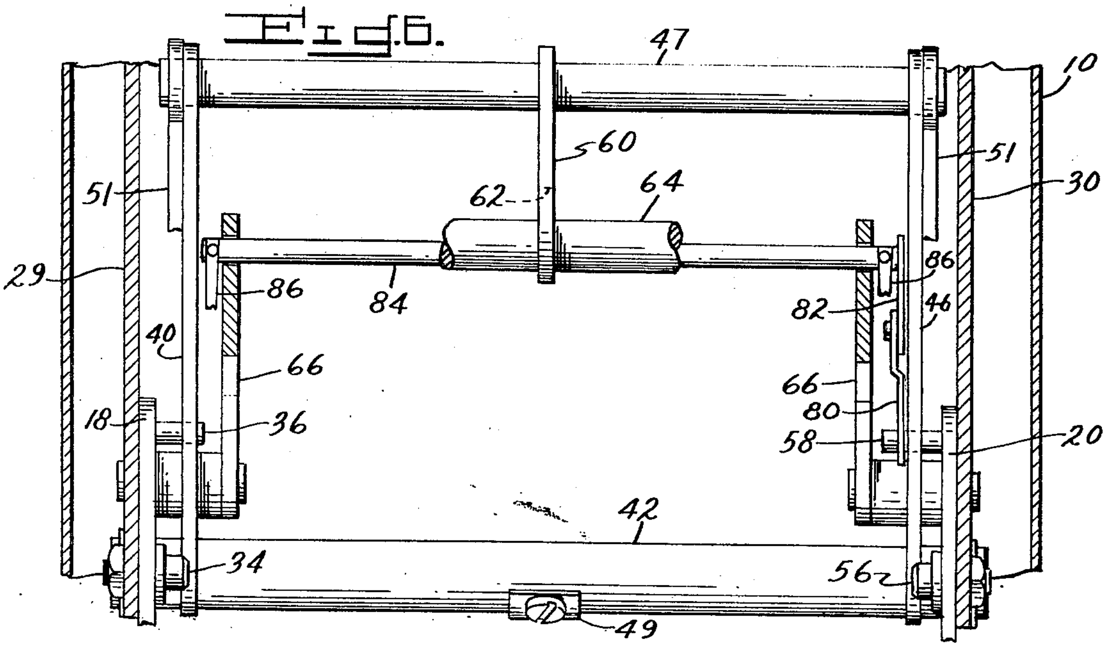
FIG. 6 is a section taken along line 6—6 of FIG. 5.

As shown in FIG. 4, the time clock embodying this invention comprises a rotatable printing disc 25 driven by a timer, the card carrier 24 and striker or hammer 26 pivotable together as a unitary structure about pins 28 which extend inwardly from the side walls 29 and 30 (FIG. 5) of the mechanism. The card carrier has a window or opening 32, FIG. 5, facing toward or in the direction of the printing disc 25. Selective downward movement of the "In" and "Out" levers 18 and 20 cause movement of the unitary striker and card carrier toward the printing disc 25, on the face of which are two concentric bands or rings of printing indicia 31.

The "In" lever is pivotable, against the tension of a spring 35, about a pin 34, which extends inwardly from the side wall 29. A pin 36 projects inwardly from the inner end of the lever 18, and when the lever is in its "up" position, the pin is disposed in a recess or cam slot 38 formed in the lower edge portion of a crank arm 40. The crank arm is secured at one end to a shaft 42 rotatably received at its outer ends in the side walls of the clock casing. A similar crank arm 46, FIG. 7, extends from the opposite ends of the shaft 42. Rotation of either crank arm 40 or 46 causes rotation of shaft 42. A flexible brake finger 49 (FIG. 5) extends from the shaft and is rotatable therewith to engage the back surface of the printing disc so as to arrest rotation of the disc during the instant of printing on a time card. A cross rod 47 extends between the outer ends of the crank arms 40 and 46 so that downward rotation of either the "In" or "Out" lever causes both crank arms 40 and 46 to be swung forwardly.

Figure 7:
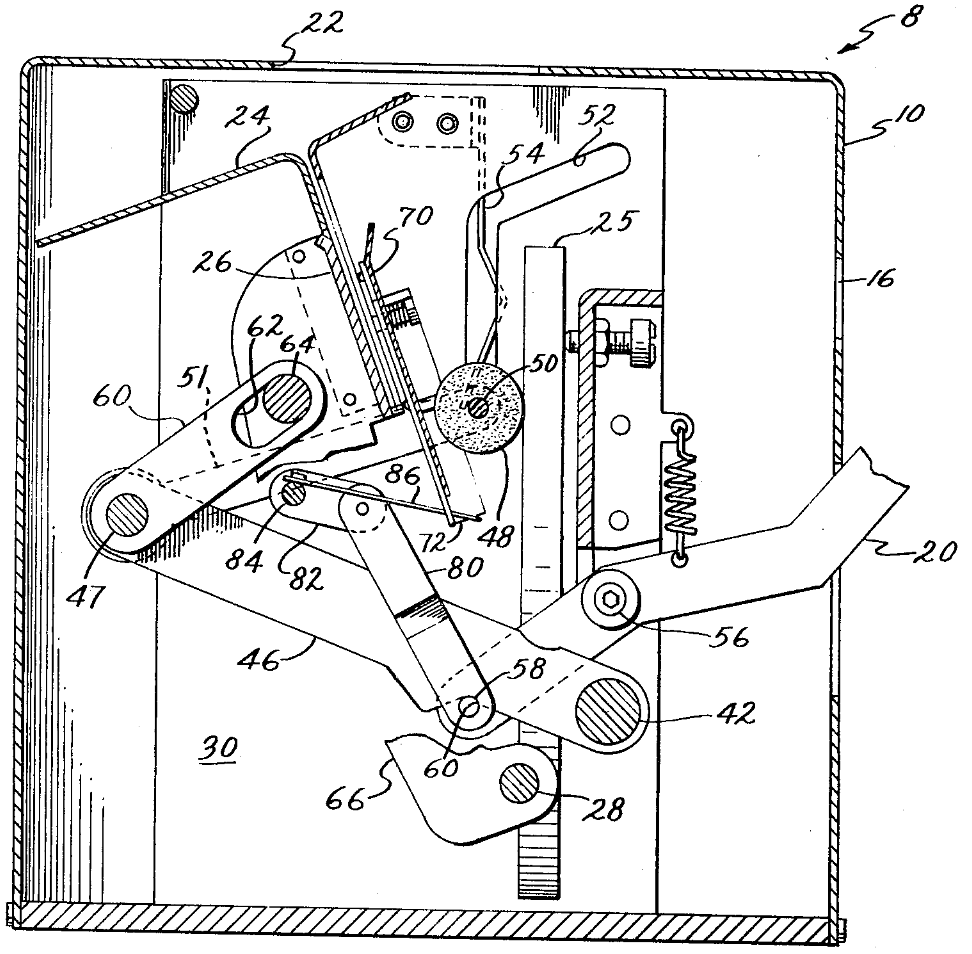
FIG. 7 is a side elevational view showing one side of the mechanism embodying the invention.

An ink roll 48 is rotatably carried on a shaft 50 which is supported at its opposite ends by links 51 extending from the outer ends of the shaft 47. The ends of the shaft 50 ride in cam slots 52, FIG. 7, provided in both side walls 29 and 30 of the frame. Positioned adjacent the edge of the cam slots 52 is a depending leaf spring 54 which urges the shaft of the ink roller forwardly so it remains in good rolling contact with the leading edges of the cam slots 52.

As shown in FIG. 7, the "Out" lever 20 is also pivotable about a pin 56 which extends from the adjacent side wall of the housing. On the inner edge of lever 20 a pin 58 projects inwardly into a cam slot 60 in the underside of the crank 46. The lever and crank operates in the same manner as the "In" lever previously described, thus the operation of both the "In" and "Out" levers causes the ink roll 48 to be moved upwardly along the path of the cam slots 52 and in contact with the upper portion of the printing disc 25.

After the ink roll has moved over the initial portion of its travel, means is provided for bringing the printing disc and card carrier, backed by the striker plate 26, into contact for imprinting a card disposed in the carrier. As shown, the mechanism comprises a link 60 (FIG. 3) pivotably carried at approximately the center of the cross rod 47. The inner end of the link 60 has an elongated slot 62, FIGS. 4 and 7, fitted around cross rod or shaft 64 which extends between the two upwardly extending supporting arms 66 of the card carrier and striker mechanism.

As previously mentioned, the arms of the card carrier and striker are pivotably disposed on pins 28 which extend from the opposite side walls of the housing. When the crank arms 40 and 46 are moved by either the "In" or "Out" lever, the link 60 moves relative to rod 64 until the inner edge of the slot 62 engages the shaft 64. Continued movement of the link 60 will cause the support arms 66 to be pivoted forwardly until the carrier 24 is brought into contact with the printing disc. A coil spring 61, FIG. 8, extends from one of the arms 66 and serves to bias the carrier and striker in a retracted position shown in FIG. 7. The length of the slot 62 is of sufficient extent to enable the ink roll 48 to apply ink to the upper portion of the printing disc 25 and to move clear before the carrier 24 is swung into contact with the printing disc.

Means for selectively masking portions of the card is also provided. In the embodiment shown, this means includes a very thin shield 70 movable radially relative to the printing disc 25 whereby one or the other portions of the card opposite the bands of printing indicia 31 are selectively masked. An elongated slide 72 (FIG. 5) is attached to each of the outer edge portions of the shield. A pin 74 extends forwardly from the carrier and is received in the elongated slot 76 through the slide 72. A U-shaped bracket 78 is secured to the outer edge of the slide 72 and serves with the pin 74 to limit the travel of the slide. The shield is moved in response to operation of the "Out" lever 20. Means for moving the shield comprises pivotably connected links 80 and 82 (FIG. 7). Link 80 extends at its lower end from the pin 58 carried by the inner end of lever 20, and is connected to link 82. The upper end of link 82 is received by shaft 84 which has its opposite ends rotatably supported in openings in the arms 66 (FIG. 4). The link 82 is affixed to the shaft so that the shaft is rotated thereby when the "Out" lever 20 is pressed downward. Extending forwardly from each end of the shaft 84 is a small leaf spring or flexible finger 86 which projects through openings adjacent the lower edge of the slide plates 72 by which the shield 70 is carried. With this arrangement, downward movement of the "Out" lever causes the leaf springs 86 on each end of the shaft 84 to pivot the shield upwardly and thereby lift the shield radially with respect of the card carrier. When released the springs assist in returning the shield to its lower position.

The shield has a slot 88 therethrough with an upper arcuate portion disposed to register with the outer band of indicia on the printing disc 25. A second arcuate portion extends over at least a 12 hour portion of the time printing indicia since in the embodimnt shown an arrow head is provided in each 12 hour quadrant of the 48 hour printing disc. Consequently, when the shield is in its lower position, as when the "In" lever is actuated, a small portion of the outer band of time related indicia is printed on the outer portion of the card as shown at 90 in FIG. 2. At the same time, an index mark or arrow head 92 is printed on the card through the longer arcuate position of slot 88. When the "Out" lever is actuated the shield is raised so that the portion of the shield below the slot 88 masks the card carried in the carrier from the outer band indicia and arrows, and exposes that portion of the card for imprinting by the inner band of indicia and the printing disc. In this sequence of movement a semi-circular recess 94 is in registration with the outer edge of the inner band of time related indicia so that only the band of indicia shown at 96 (FIG. 3) is printed on the time card.

OPERATION

Figure 8:
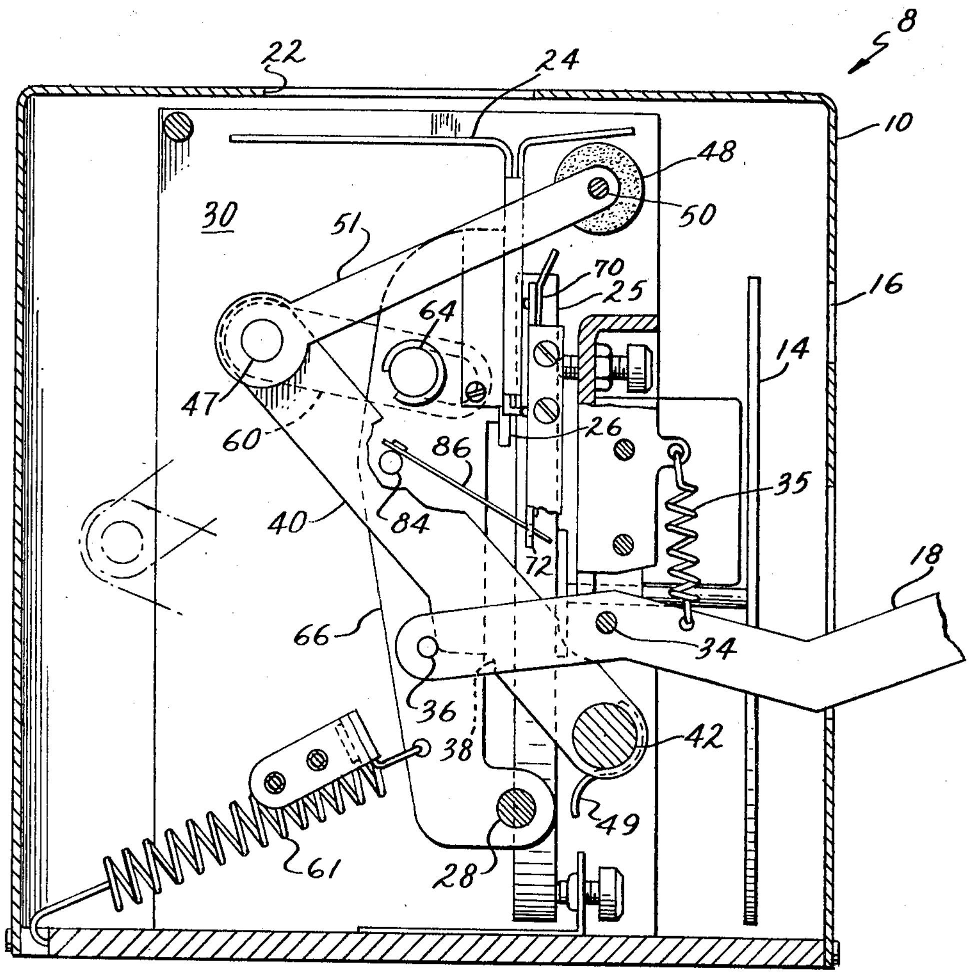
FIG. 8 is a view similar to FIG. 7 with the mechanism in different operative relationship.

The operation of the time clock of the present invention will best be understood by referring to FIGS. 4, 7 and 8. In particular, a card, such as shown in FIG. 2, may be used in the present invention. The card may be preprinted with the name of the employer-company with positions available for the name of the employee, the name of the particular job, the date and any other desired information. As shown, the card has imprinted thereon an "In" arrow *a* disposed at the approximate center of the card.

As mentioned earlier, the printing disc 25, FIG. 4, has two concentric bands of time related printing indicia 31 thereon. The time is divided into equally spaced quadrants, each quadrant representing a 12 hour period. As further shown, under the numeral 12 of the "In" band there is a pointer arrow, as at 92 in FIGS. 2 and 3. This pointer comes into play for indicating elapsed time as will be explained. Due to the quadrant design of the printing disc 25 and the configuration of the printing shield 70, each actuation of the "In" lever 18 will cause a small segment of time 90 to be printed on the card *c*, FIG. 2, and the printing of the arrow head 92 which forms the reference for elapsed time reading by subsequent actuation of the "Out" lever 20.

In the operation of the time clock, a blank time card *c* is placed in the card slot of the card carrier so that the lower edge of the card extends across a semi-circular recess 94 of the shield 70. At this time the relative position of the elements of the time clock are as depicted in FIG. 7. The "In" lever 18 (FIG. 8) is then pressed downward which results in the following sequence of events. The pin 36 carried by the lever, cams the crank 40 upwardly. The shaft 42 is thus rotated to move the crank arm 46 affixed to the opposite end of the shaft. This in turn causes both cranks to move upwardly carrying the inking roll 48 upwardly in guide channels or camming slots 52 to ink the face of the printing disc 25. After the inking roll has reached a position adjacent the upper edge of the disc, continued movement of the crank arms 40 and 46 cause the link 60 to move shaft 64. As a result the arms 66 are swung forward so that the carrier 24 and the striker are swung into engagement with the printing disc 25. Actuation of the "In" lever 18 causes no movement of shield so that the aperture or slot 88 of the shield 70 is registered with the outer portion of the printing disc whereby an imprint is made on the card, as shown in FIG. 2. Once the lever 18 is released the biasing means or return springs 35 and 61 will return the various levers and linkages to their original positions.

The card *c* may again be placed in the card carrier, usually after some elapsed time interval. The "Out" lever 20 is then pressed downward and when this is done the cranks 40 and 46 are swung forwardy in the same manner as described before, and again ink is applied to the printing disc as described. Now, however, link 80 is moved to pivot link 82 upwardly causing rotation of shaft 84 and thus upward angular movement of flexible fingers 86. As a result, the shield 70 is raised so that its lower semi-circular recess 94 exposes the card to the inner circumferential band of printing indicia while masking both the outer band of indicia and the reference index marks or arrows. As a result, the card *c* is imprinted with a band of time related indicia, as shown at 96 in FIG. 3. The previously imprinted arrow or index 92 will now be registered opposite the amount of time which has expired since the index mark was printed by operation of the "In" lever. This is, of course, the result of rotation of the printing disc during the elapsed time interval.

When the "Out" lever is released, the various biasing means, previously discussed, return the parts to their original position. The card *c* may then be removed.

It will readily be appreciated by those skilled in the art that the printing indicia on the printing disc need not be limited to time indicia, as shown in the illustrative embodiment. For example, any time related value, such as money, may be substituted for the time indicia shown. In this way, a direct money reading may be obtained in proportion to a predetermined elapsed time.

Having thus described this invention, what is claimed is:

1. An elapsed time device comprising a rotatable printing disc having at least two concentric bands of time related printing indicia disposed about one face of said disc, one of said bands including an elapsed time indicator mark, a card receiver pivotable toward and away from said printing disc for bringing a card disposed in said receiver into printing engagement with the indicia on said printing disc, a striker carried for pivotable movement with said receiver for pressing said card into said printing engagement, said striker having a radial span at least equal to the width of the two bands of indicia on the face of said disc, and a shield with a slot therethrough having a portion disposed to register with the outer band of indicia and another portion disposed to register with said time indicator mark, said shield having an arcuate edge arranged to expose a portion of the inner band of printing indicia, said shield being movable radially relative to said disc for selectively masking one and the other of the bands of printing indicia whereby the indicator mark indicates the time elapsed between sequential imprintations.

2. An elapsed time device as set forth in claim 1 in which first and second levers are provided for actuating pivotable movement of said receiver and striker for printing engagement with the disc, and means for moving said shield in response to movement of one of said levers for selectively masking one and the other of said bands of printing indicia whereby said mark indicates the time which has elapsed between sequential imprintations.

3. An elapsed time device as set forth in claim 2 and further including a drive mechanism for rotating said disc and a braking member engageable with said disc in response to operation of said first and second levers.

4. An elapsed time device as set forth in claim 1 in which the slot through said shield is of arcuate configuration corresponding to the concentric band of indicia on said disc and having a semi-circular lower edge portion concentric with said opening and disposed to register with the inner concentric band of indicia.

References Cited

UNITED STATES PATENTS

| | | | |
|---|---|---|---|
| 876,776 | 1/1908 | Degenhardt | 346—91 |
| 3,167,380 | 1/1965 | Williams | 346—82 |
| 3,409,903 | 11/1968 | Williams | 346—82 |

JOSEPH W. HARTARY, Primary Examiner

U.S. Cl. X.R.

346—88, 92